July 19, 1932.  W. C. NABORS  1,868,021
VEHICLE TRAILER
Filed June 5, 1931
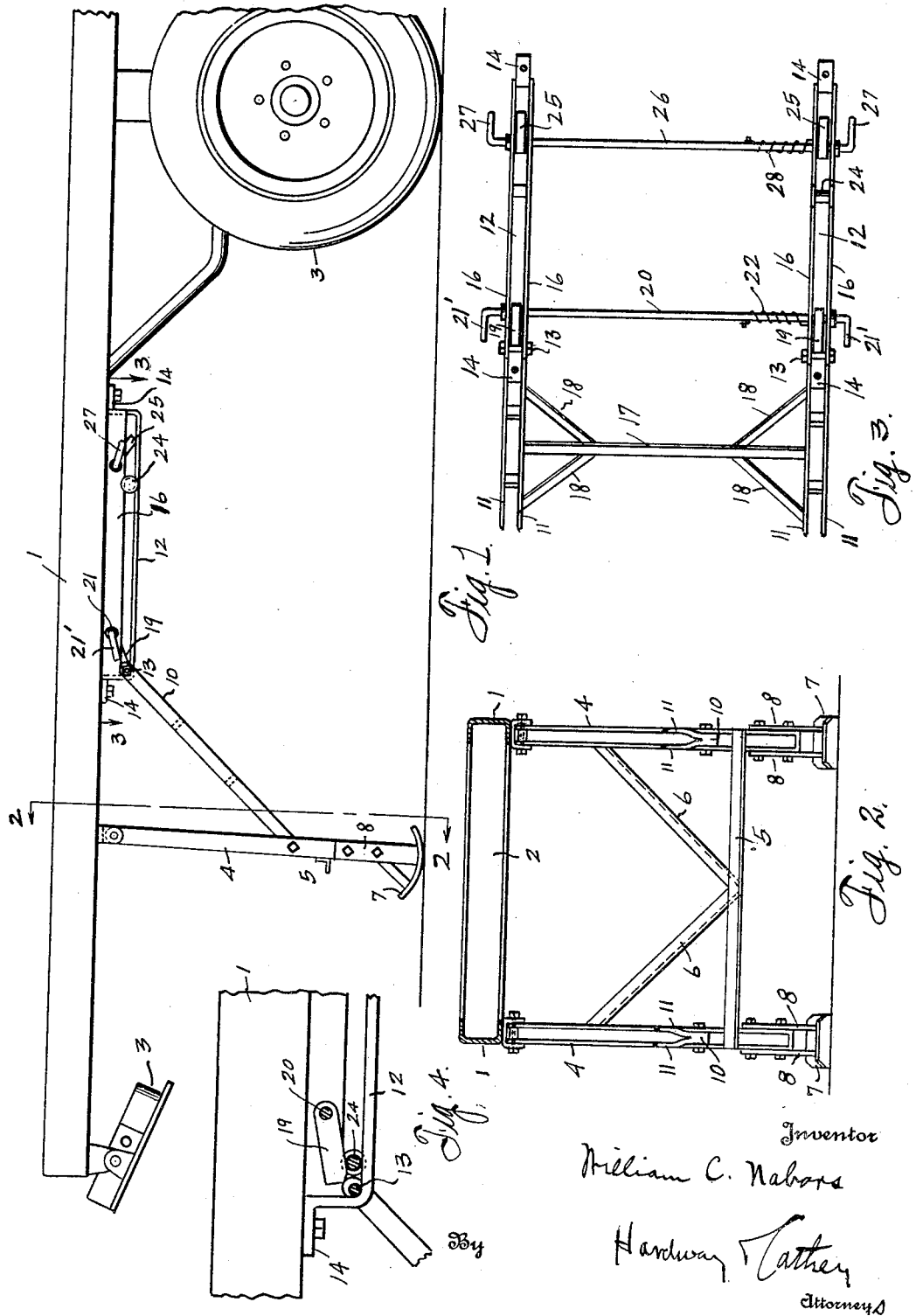

Patented July 19, 1932

1,868,021

UNITED STATES PATENT OFFICE

WILLIAM C. NABORS, OF MANSFIELD, LOUISIANA

VEHICLE TRAILER

Application filed June 5, 1931. Serial No. 542,334.

This invention relates to a vehicle trailer, and has particular relation to novel means for supporting the forward end thereof.

An object of the invention is to provide a trailer for load carrying vehicles having novel means for supporting the forward ends thereof when the trailer is disconnected from the draft vehicle in front.

Another object of the invention is to provide a trailer with supporting legs at the forward end thereof whereby the trailer either loaded or without a load may be supported with its forward end in position to be coupled with the draft vehicle in front.

Another object resides in the provision of supporting legs for the trailer with means for retaining the same in active, or supporting position, or in inactive, or folded position.

Another object resides in the provision of a novel construction whereby the supporting legs are permitted to yield and move toward folded position when the trailer is connected to and moves forwardly with the draft vehicle.

This application discloses certain improvements over the disclosure of my pending application Serial No. 505,527, filed December 30, 1930, on vehicle, and broadly claimed in said copending application, this application being confined to certain improvements not disclosed in said copending application.

With the above and other objects in view, the invention has particular relation to certain novel features of construction, operation and arrangement of parts, an example of which is given in this specification and illustrated in the accompanying drawing wherein:

Figure 1 shows a side view of the trailer.

Figure 2 shows a vertical sectional view taken on the line 2—2 of Figure 1.

Figure 3 shows a fragmentary horizontal sectional view taken on the line 3—3 of Figure 1, and Figure 4 shows an enlarged fragmentary longitudinal sectional view.

Referring now more particularly to the drawing wherein like numerals of reference designate similar parts in each of the figures, the numerals 1, 1 designate the side members of the frame work of the trailer which are preferably formed of channel iron. These side members are suitably connected together by the forward cross member 2 and by other suitable cross members of any conventional construction. The rear end of the trailer frame is supported on the usual ground wheels 3 in any selected manner.

There are the front supporting legs 4, 4 arranged near the forward end of the trailer frame. The upper ends of these legs are pivoted to the respective side members 1 in any selected manner and their lower ends may be connected by a cross bar 5 and the leg structure may be reinforced by the angle braces 6, 6 if desired. At the lower ends of these legs, are the supporting feet, 7, 7, which are preferably formed of relatively wide plates of a general arcuate contour with their convex sides facing downwardly. These feet may be secured to the corresponding legs in any approved manner, preferably by the spaced shanks 8, 8 which embrace the lower ends of said legs and are bolted thereto. Associated with the respective legs are the corresponding side links 10, 10. The lower ends of these links are pivoted to the respective legs 4 in the rear. Each link is formed with the spaced side bars 11, 11 which are joined integrally together at their lower ends and whose upper ends embrace the corresponding tracks 12, 12 and are connected by the bolts 13, 13 which are adapted to move along the corresponding tracks. Each track is formed of a strap of metal and is of a U-shaped form and has its ends 14, 14 outwardly turned and fitted against the undersides of the respective side members 1, and which are secured to said side members in any approved manner as by set screws. On opposite sides of each track are the bearing plates 16, 16 which are secured to the upturned ends of the tracks 12, in any preferred manner as by welding. The links 10 are secured together and braced by means of a suitable cross bar 17, and the angle braces 18, 18.

When the legs 4 are in vertical or supporting position, the bearing bolts 13 will be at the forward ends of the tracks 12 and will be maintained in such position by means of the retaining dogs 19, 19 which work between the corresponding plates 16, 16 and whose lower ends normally engage behind said bolts 13. These dogs are fixed to the transverse rod 20 which works through aligned bearings 21 in the plates 16 and whose ends have the overturned grips 21', 21' at the sides of the trailer. Around the rod 20 there is a coil spring 22 one end of which is attached to said rod and the other end of which is attached to the adjacent inside plate 16 and which is effective to hold the dogs 19 in such engagement.

The forward end of the trailer frame has the depending coupling member 23 whereby the trailer may be coupled to a draft vehicle in front and when this coupling is effected the forward end of the trailer frame will be slightly elevated to relieve the feet 7 from the weight of the trailer and the forward end of the trailer will then be supported by said draft vehicle. The coupling of the draft vehicle to the trailer is effected by running said draft vehicle rearwardly to bring a coupling member carried by it into coupling relation with the coupling member of the trailer. Mounted on one of the tracks 12 there is a spool 24 mounted for free movement along said track. Before the coupling operation above described is carried out the driver of the draft vehicle may run the spool 24 under the corresponding dog 19 and this will operate to hold both of said dogs 19 elevated clear of the corresponding bearing bolts 13 and when the coupling is effected and the draft vehicle moves forwardly the trailer will move forwardly with it and the friction of the feet 7 against the ground will cause a relative rearward movement of the legs 4 and the bearing bolts 13 will pass under the dogs 19 and will move along the tracks 12 forcing the spool 24 ahead. A single operator can thus effect the coupling operation without injury to the supporting legs 4, and associated parts. Were it not for the spool 24, or some equivalent, to hold the dogs 19 elevated, a helper would be required to hold said dogs elevated while the coupling is being made and the trailer moved forwardly to release the feet 7 from contact with the ground surface. It has been heretofore stated that these feet are arcuate with their lower sides convex. This construction is provided so that as the draft vehicle and trailer move forwardly the under faces of the feet will roll on the ground surface and an upward thrust will not be imparted through the legs 4, to the trailer frame. When the feet 7 have fully cleared the ground surface, the legs 4 may be swung rearwardly and upwardly and the bearing bolts 13 will thereupon slide along the tracks 12 toward the rear ends thereof. At the rear ends of said tracks there are the dogs 25, 25, which are fixed on the cross rod 26 and which work between the corresponding plates 16, 16. The ends of the rod 26 have the overturned grips 27, 27 at the sides of the trailer. There is a coil spring 28 around the rod 26 one end of which is attached to said rod and the other end of which is attached to the adjacent inside plate 16. This spring normally holds the dogs 25 in position to engage behind the bearing bolts 13 when the latter have run to the rear end of the tracks 12. As the legs 4 approach their final upper position the bearing bolts 13 will pass underneath the dogs 25, moving the spool 24 ahead and when they have cleared said dogs, the dogs will drop down behind said bolts and lock the legs in the upper or inactive position.

The springs 22, 28 thus serve to hold the dogs 19, 25 in locking position whereby the legs 4 may be locked in active or inactive position and the rods 20, 26 are provided with the hand grips at each end so that the dogs may be released from either side of the trailer.

The drawing and description disclose what is now considered to be a preferred form of the invention by way of illustration only, while the broad principle of the invention will be defined by the appended claims.

What I claim is:

1. A trailer having a frame and supporting wheels therefor, supporting legs pivoted to the frame and arranged to support the forward end thereof, tracks on the frame, links pivoted at one end to the legs and having bearing means at their other ends which run on said tracks, transverse rods mounted to rotate on the frame, dogs on said rods engageable with said bearing means to hold the latter at either end of the tracks, and means movable along one of said tracks and engageable underneath one of said dogs and effective to hold the dogs of the corresponding rod in inactive position out of engagement with said bearing means.

2. In a trailer having a frame and supporting wheels for the rear end thereof, a supporting leg pivoted to the frame and arranged to support the forward end of the frame, a foot at the lower end of the leg having a convex under surface, a lengthwise track on the frame, a link pivoted at one end to said leg, bearing means at the other end of said link arranged to run on said track, means engageable with said bearing means to lock the same in either of two positions on the track, means movable relative to the track into position to engage and hold one of said locking means in inactive position out of engagement with said bearing means.

3. In a trailer having a frame and supporting wheels for the rear end thereof, a supporting leg pivoted to the frame and arranged to support the forward end of the frame, a foot at the lower end of the leg having a convex under surface, a lengthwise track on the frame, a link pivoted at one end to said leg, bearing means at the other end of said link arranged to run on said track, means engageable with said bearing means to lock the same in either of two positions on the track, means movable relative to the track into position to engage and hold one of said locking means in inactive position out of engagement with said bearing means, a yieldable means normally holding said engaging means in said engaging position.

4. A trailer having a frame and supporting wheels therefor, supporting legs pivoted to the frame and arranged to support the forward end thereof, tracks on the frame, links pivoted at one end to the legs and having bearing means at their other ends which move on said tracks, pairs of dogs engageable with said bearing means to hold the latter at either end of the tracks and means movable along one of said tracks and engageable underneath one dog of either pair and effective to hold the dogs of said pair of dogs in inactive position out of engagement with said bearing means.

In testimony whereof I have signed my name to this specification.

WILLIAM C. NABORS.